Aug. 30, 1927.
C. A. JOHNSON
THREADING TOOL
Filed Jan. 9, 1922
1,640,942
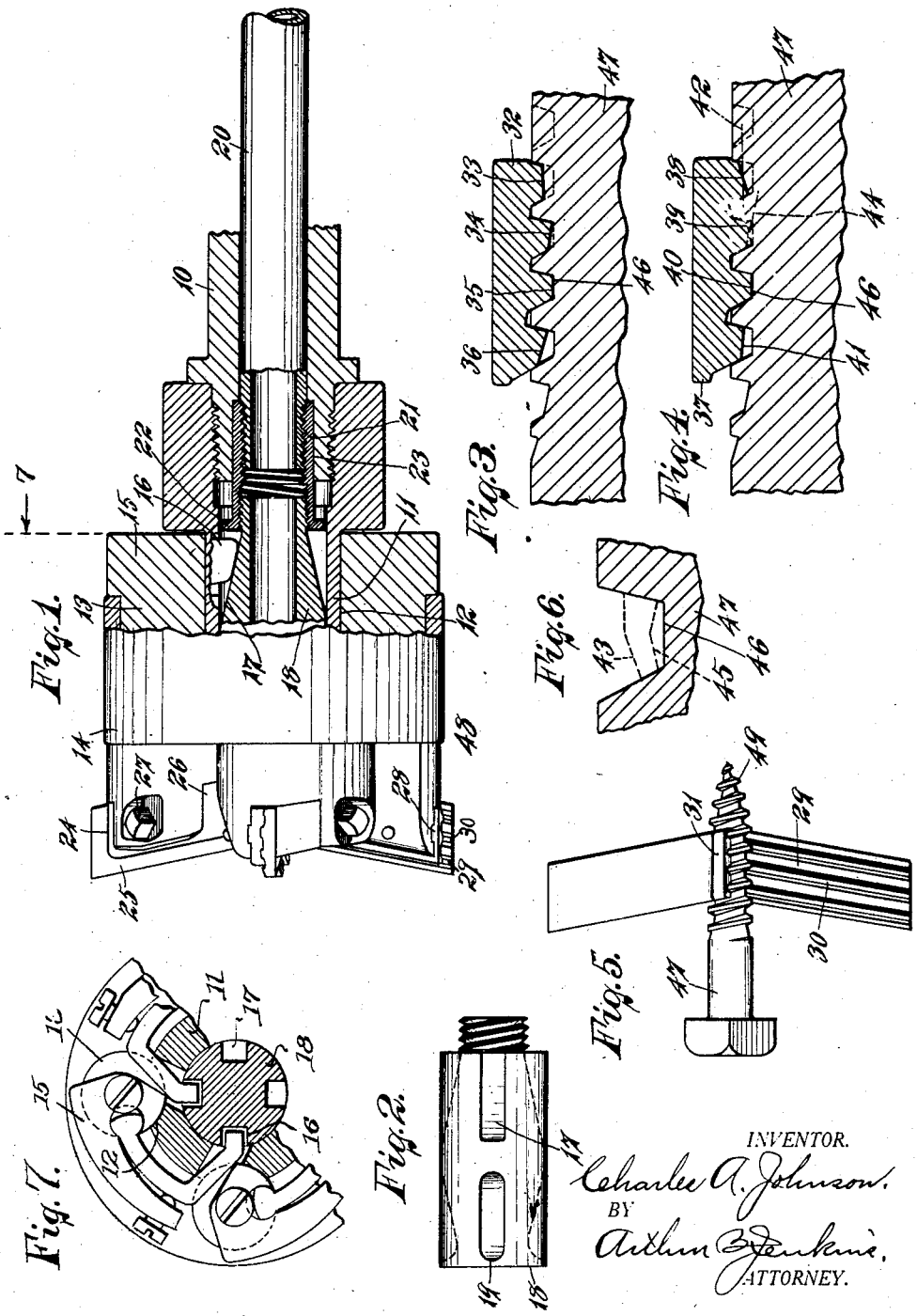
INVENTOR.
Charles A. Johnson.
BY
Arthur B. Jenkins,
ATTORNEY.

Patented Aug. 30, 1927.

1,640,942

UNITED STATES PATENT OFFICE.

CHARLES A. JOHNSON, OF UNIONVILLE, CONNECTICUT.

THREADING TOOL.

Application filed January 9, 1922. Serial No. 527,917.

My invention relates to the class of devices for cutting threads upon blanks, and more especially to that class of such devices as are employed for producing threads on wood screws, and an object of my invention, among others, is to provide a device of this class that shall be strong and durable, simple in construction and particularly efficient in its operation.

One form of threading device embodying my invention and in the construction and use of which the objects herein set out, as well as others, may be attained, is illustrated in the accompanying drawings, in which—

Figure 1 is a detail view partially in side elevation and partially in section of my improved threading tool.

Figure 2 is a detail side view of the actuator.

Figures 3 and 4 are detail views, scale enlarged, of different forms of threading dies showing their cooperation in cutting a thread.

Figure 5 is a detail view of two of my improved threading dies shown as engaged with the thread of a wood screw, which thread is produced by the operation of said dies.

Figure 6 is a detail view, scale enlarged over that of Figures 3 and 4, illustrating the operation of the cutting ribs in forming a thread.

My invention illustrated and described herein is especially applicable in connection with a threading tool of the general character of that shown in my patent dated September 28, 1920, No. 1,354,305, to which reference is hereby made for an understanding of parts of the main device not comprised in the present invention and, therefore, not specifically illustrated and described herein.

In the accompanying drawings the numeral 10 indicates the shank of my improved threading tool, that may be secured to the spindle of a lathe in any suitable manner to be driven thereby, or which shank may constitute the spindle of a lathe if desired, it being understood that the articles to be threaded, as blanks for the production of wood screws, will be held in a suitable chuck or other device in a manner readily understood by those skilled in the art, said threading tool having relative rotation as well as relative lengthwise movement with respect to the articles being threaded.

The boly 11 has grooves 12 extending lengthwise along its outer surface and at equal distances apart, said grooves being of semi-circular form to receive die holders 13, round in form in cross section and held in place as by means of a retaining sleeve 14 surrounding the body and having grooves of semi-circular shape on their inner surface to correspond with the grooves in the body and forming therewith round holes to receive said holders. Each of the holders has an arm 15 extending from one end more or less in the direction of the circumference of the tool and each of said arms has a finger 16 extending therefrom, the inner ends of said fingers being located in recesses 17 formed in an actuator 18. The bottoms of these recesses are cam shaped so that as the actuator is moved longitudinally in one direction the arms will be forced outwardly and the die holders 13 will be turned, and other means, not herein shown, are connected with the holders and extend into recesses 19, the bottoms of which are of cam shape to rotate the holders in an opposite direction from that above described when the actuator 18 is moved longitudinally in an opposite direction from that above described.

An actuating bar 20 extends into or through the lathe spindle and may be operated in any well known manner as by means of cams or levers to move it in opposite directions for the purpose of imparting the above described longitudinal movement to the actuator 18. As a means of connecting the actuator and actuating bar I employ a coupling sleeve 21 having an interior screw thread to fit corresponding threads upon the adjacent ends of the bar and actuator as clearly shown in Figure 1 of the drawings. The recesses 17 are originally formed as grooves, and the coupling sleeve closes the ends of said grooves converting them into recesses, in the preferred form of construction said sleeve having a flange 22 of substantially the diameter of the actuator, said flange closing the ends of the grooves for substantially their whole depth.

In my improved device as herein shown the shank 10 is secured to the body as by means of a thread on the end of the shank fitting a screw threaded opening in the end of the body, and the shank, that is hollow, is enlarged or counterbored as at 23 to receive one end of the coupling sleeve 21, as clearly shown in Figure 1 of the drawings.

The holders 13 each have at one end a tool receiving groove 24 within which threading members 25 are secured in any suitable manner, in the structure herein shown clamps 26 being forced by clamp screws 27 against the threading members to hold them in contact with die blocks 28 secured within the grooves 24 in any suitable manner and having ribs and grooves corresponding to ribs 29 and grooves 30 on the dies. The construction of these ribs and grooves comprises an important feature of my invention, said ribs and grooves running out at the cutting ends of the threading members, which cutting ends are beveled as at 31 to form the tool into a cutter.

The ribs upon the dies each comprises a cutting member shaped to produce a portion of a thread on a blank, all of the cutting members employed in a single operation collectively operating to produce a thread of required shape. While my invention is not limited to any specific number of cutting dies or to any specific number of cutting ribs or members upon each die, or to any special arrangement of such dies, a satisfactory arrangement has been found by me to embody four dies each having four cutting ribs or members, said dies being arranged in sets, each set comprising two dies diametrically oppositely arranged. One set of such dies comprising die members 32 is provided with thread cutting ribs 33—34—35 and with a point cutting rib 36, and the die members 37 are each provided with thread cutting ribs 38—39—40 and with a point cutting rib 41. The ribs or cutting members 33 are arranged to cut a portion only of the groove or grooves comprising the thread, a rib on one set of dies cutting a different portion of the groove from that cut by the corresponding rib of the other set of dies, and each successive rib on each set of dies cutting the groove deeper than the next preceding rib on said dies. In the preferred arrangement these ribs or cutting members are so arranged that the corresponding ribs on each set of dies will form the bottom of the groove in the blank on angles intersecting each other at about the crosswise center of the groove. For instance, the ribs 33 on the set of dies 32 will form the bottom of the groove at a certain angle as illustrated at the dotted line 42 in Figure 4, the shape of the bottom of the groove finally formed by the ribs 33—38 being as illustrated by the dotted lines 43 in Figure 6. Similarly the cutting ribs 34—39 will form the groove deeper and on angularly disposed lines, the rib 34 cutting on an angle illustrated by the dotted line 44 in Figure 4, the resulting shape of the bottom of the groove formed by the cutting ribs or members 34—39 being as illustrated by the dotted line 45 in Figure 6 of the drawings. This idea may be extended to embody different numbers of teeth but in the structure herein shown the next succeeding teeth 35—40 complete the formation of the groove cutting it to its full depth and finishing the bottom on the line 46.

The threading tool 48 or blank 47 may either or both have either or both the rotating and the longitudinal reciprocating movements. Let it be assumed that in the device as illustrated the tool 48 has both the rotating and the longitudinal reciprocating movements; after the thread has been cut upon the body of the blank 47 the point 49 is formed, and this is accomplished by causing the dies or threading members to approach one another, this operation being effected by means of longitudinal movement of the actuating bar 20. As the dies are closed toward each other the point cutting ribs 36—41 operate to form the rib at the point, the cutting edges of the point cutting ribs being relatively angularly disposed as hereinbefore described with respect to the ribs 33—38 and 34—39, the point being thus formed as illustrated in Figure 5 of the drawings.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim—

1. A threading tool including a body, die holders rotatably mounted in the body, an actuator mounted for reciprocating movement in the body to operate said holders, an actuating bar, and a sleeve connecting said bar and actuator.

2. A threading tool including a body, die holders movably mounted in a body, an actuator mounted for reciprocating movement in the body to operate said holders and having actuating grooves therein opening out at the end thereof, an actuating bar, and a sleeve connecting said bar and actuator and closing the ends of said grooves to form them into recesses.

3. A plurality of threading devices each including a threading member, each of said members being arranged to simultaneously cut a portion of both sides of a groove between threads and at the same time to cut a portion of one side of said groove that is left uncut by the other member.

4. A plurality of threading devices each including a threading member, each of said members being arranged to cut a groove and form the bottom on an angle intersecting the angle of the bottom formed by the other cutting member.

5. A plurality of threading devices arranged in sets, the members of each set being of similar formation and each set including threading members, each of which is arranged to simultaneously cut a portion of both sides of a groove between threads and at the same time to cut a portion of one side of said groove that is left uncut by corresponding members in another set.

6. A plurality of threading devices arranged in sets, the members of each set being of similar formation and each set including threading members, each of which is arranged to cut a groove and form the bottom thereof on an angle intersecting the bottom formed by the cutting members of the other set.

7. A plurality of threading devices each including a plurality of threading members each of which members is arranged to simultaneously cut a portion of both sides of a groove between threads and at the same time to cut a portion of one side of said groove that is left uncut by a corresponding member in another device.

8. A plurality of threading devices arranged in sets, the members of each set each comprising a plurality of threading members of different shapes and the members in each set being arranged to simultaneously cut a portion of both sides of a groove between threads and at the same time to cut a portion of one side of said groove that is left uncut by a corresponding member in another set of devices.

9. A plurality of threading devices arranged in sets, the members of each set each comprising a plurality of threading members of different shapes, each threading member in each set being arranged to cut a groove and form the bottom on an angle intersecting the angular formation of the bottom created by a corresponding threading member in another set.

10. A plurality of threading devices each including a threading member, each of said members being arranged to simultaneously cut a portion of both sides of a groove between threads and at the same time to cut a portion of one side of said groove that is left uncut by another member.

11. A plurality of threading devices each including a threading member, each of said members being arranged alone to cut a portion of one side of a groove between the threads and the other being arranged alone to cut a portion of the opposite side of said groove and each of said members also being arranged to simultaneously cut a portion of both sides of said groove.

12. A plurality of threading devices each including a threading member, each of said members being arranged to successively form the bottom of a groove between the threads on a plane intersecting a plane of the bottom of the groove formed by a preceding member.

CHARLES A. JOHNSON.